Figure 1:
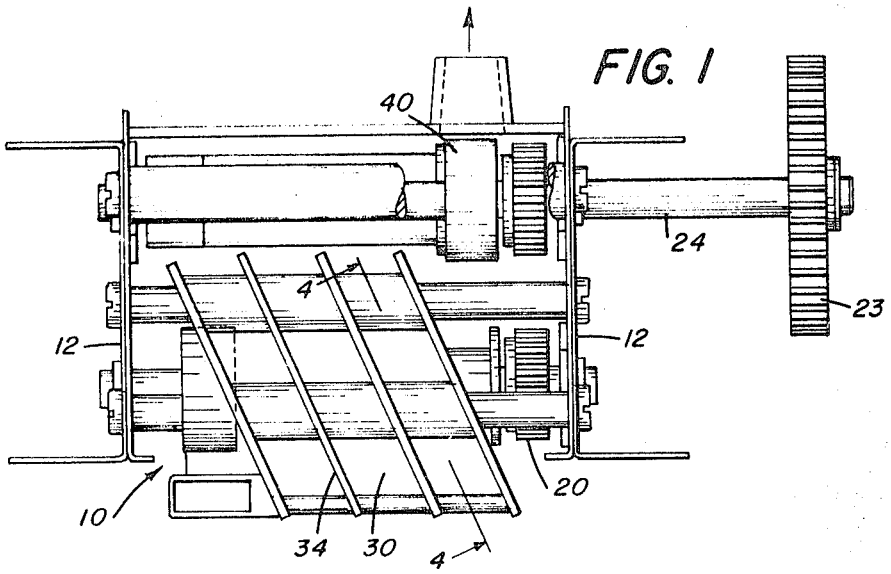
Figure 2:
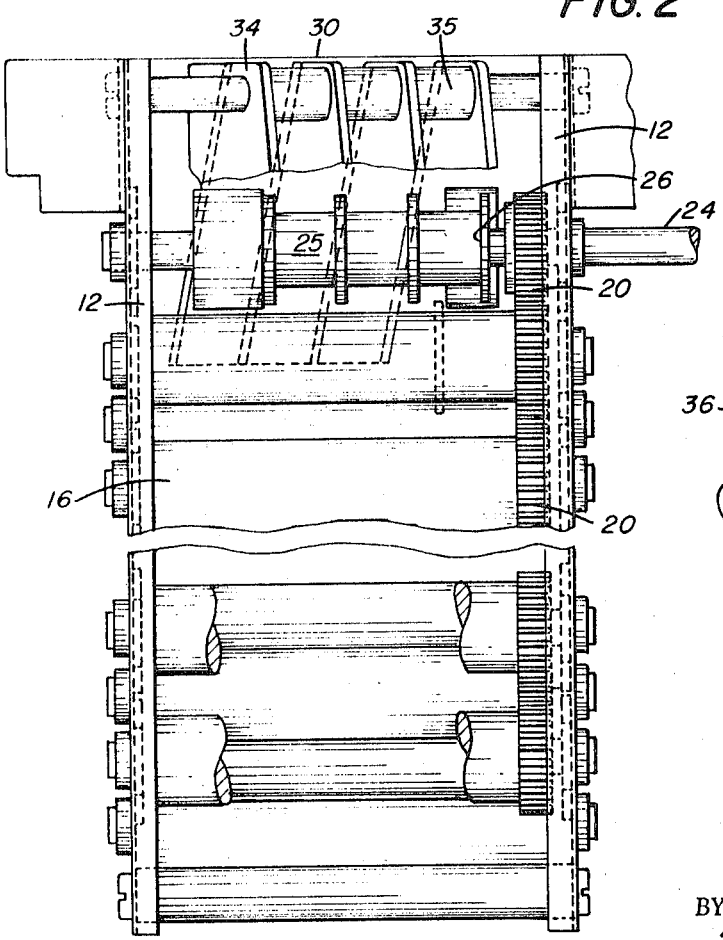
Figure 5:
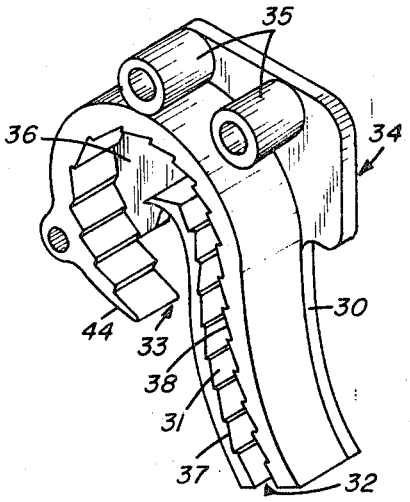
Figure 3:
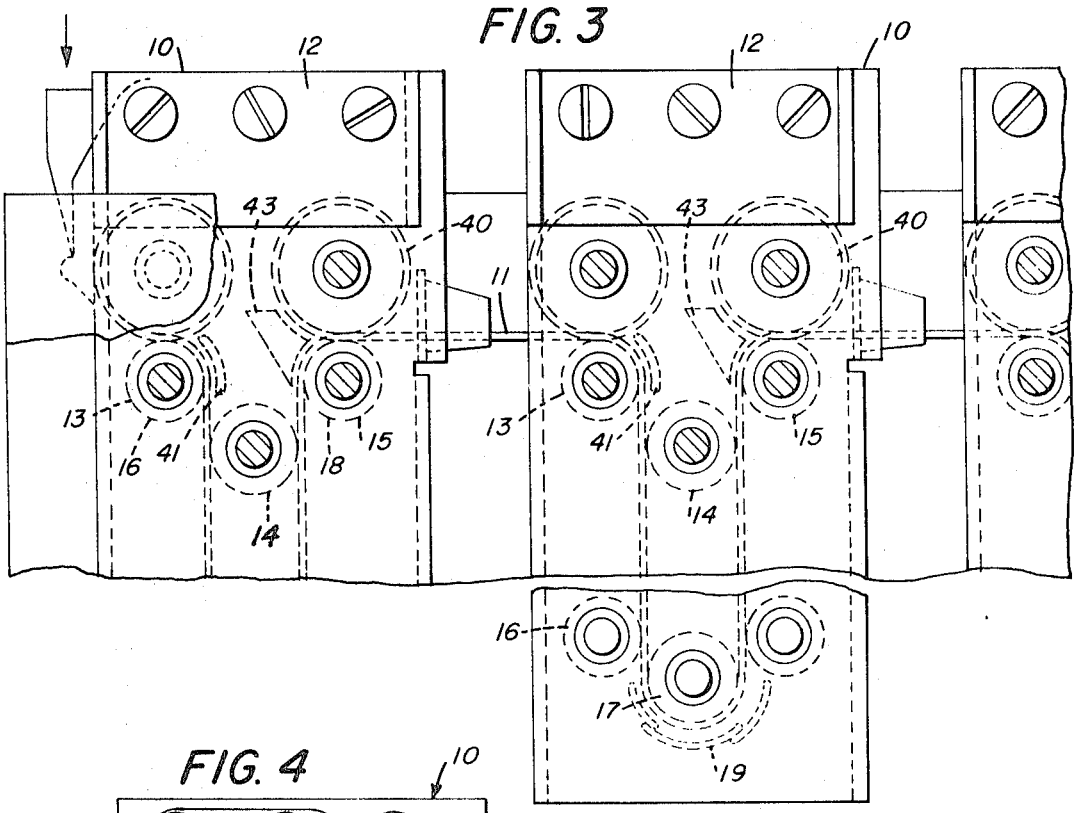
Figure 4:
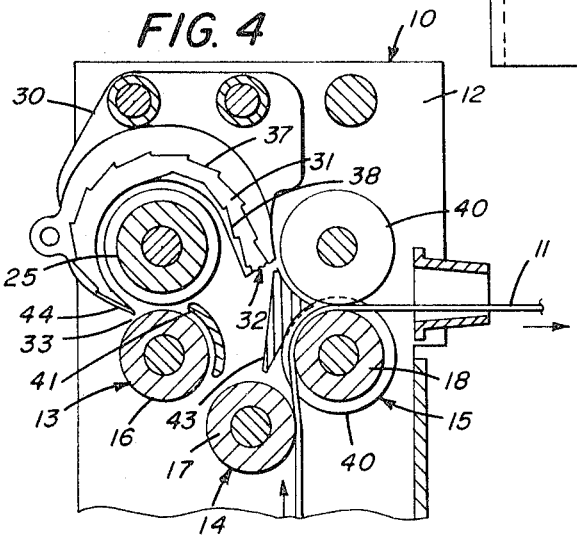
Figure 6:
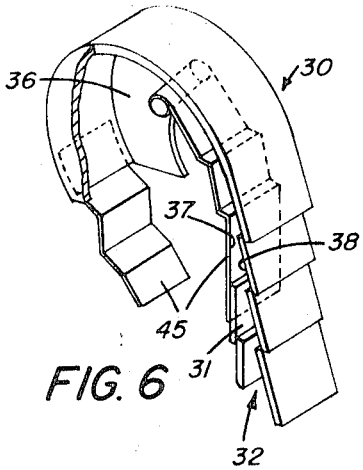
Figure 7:
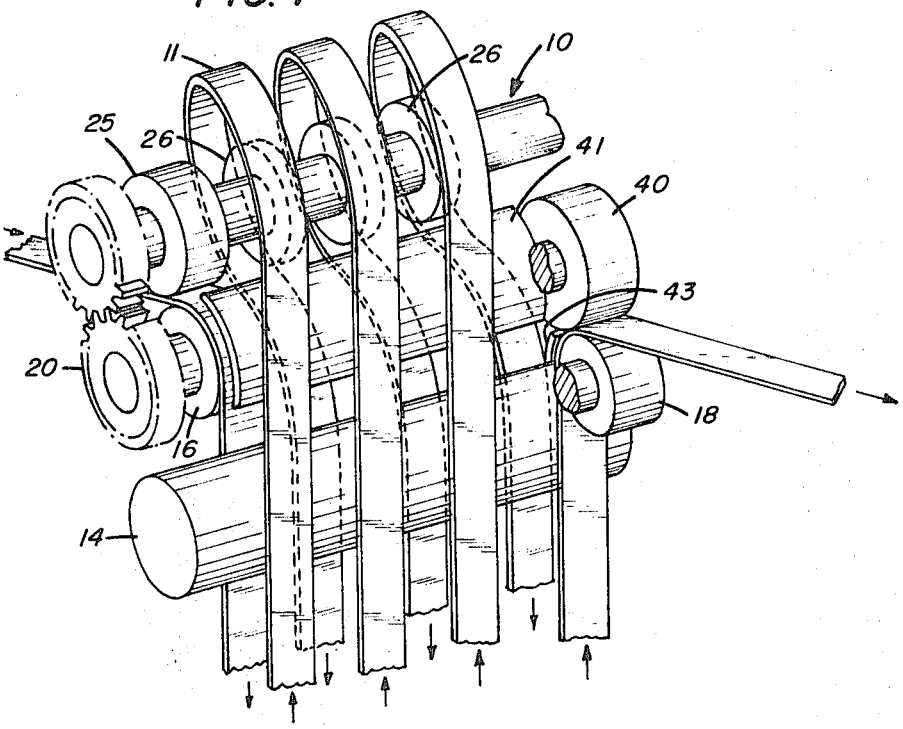
Figure 8:
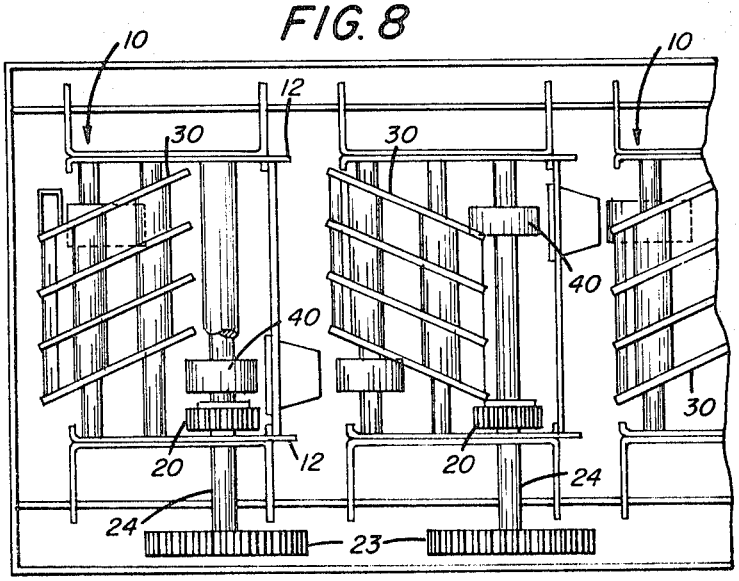

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED AUGUST 31, 1971

889 O.G. 1368

T889,028
ROLLER TRANSPORT MECHANISM FOR A WEB OF MATERIAL

Harold E. Peiffer and George M. Reitter, both % Eastman Kodak Co., Kodak Park Division, Rochester, N.Y. 14650

Filed Dec. 4, 1970, Ser. No. 95,185
Int. Cl. B65h *23/32*
U.S. Cl. 226—189
3 Sheets Drawing. 16 Pages Specification

An assembly of rollers which are arranged to move a web of material in a continuous path comprising a plurality of adjacent loop paths. The loop paths are formed by a particular arrangement of the rollers which, in turn, are of such length that a plurality of loop paths can be formed in the axial direction thereof. At one end of the loop paths, a member is arranged which has a plurality of adjacent passageways which are angularly disposed with respect to the planes of movement for the loops so that the web of material can be directed from one loop path to the next and adjacent loop path. The displacement of the passageways must be at least equivalent to the

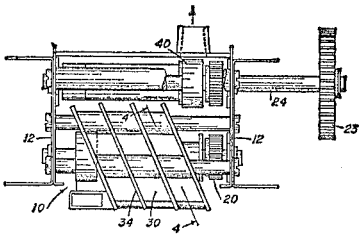

width of the web of material being transported or processed.

Aug. 31, 1971 H. E. PEIFFER ET AL T889,028

ROLLER TRANSPORT MECHANISM FOR A WEB OF MATERIAL

Filed Dec. 4, 1970 3 Sheets-Sheet 1

HAROLD E. PEIFFER
GEORGE M. REITTER
INVENTORS

BY Lloyd F. Seebach

AGENT

ROLLER TRANSPORT MECHANISM FOR A WEB OF MATERIAL

Filed Dec. 4, 1970 3 Sheets-Sheet 2

HAROLD E. PEIFFER
GEORGE M. REITTER
INVENTORS

BY Lloyd F. Seebach

AGENT

ROLLER TRANSPORT MECHANISM FOR A WEB OF MATERIAL

Filed Dec. 4, 1970 3 Sheets-Sheet 3

HAROLD E. PEIFFER
GEORGE M. REITTER
INVENTORS

BY Floyd T. Seebach

AGENT